US010929455B2

(12) United States Patent
Jetley et al.

(10) Patent No.: US 10,929,455 B2
(45) Date of Patent: Feb. 23, 2021

(54) GENERATING AN ACRONYM INDEX BY MINING A COLLECTION OF DOCUMENT ARTIFACTS

(71) Applicant: Microsoft Technology Licensing, LLC, Redmond, WA (US)

(72) Inventors: Divya Jetley, Gurgaon (IN); Hong Hong, Issaquah, WA (US); Xiaojiang Huang, Bellevue, WA (US); Xiaocheng Deng, Sammamish, WA (US); Yu Gu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/963,029

(22) Filed: Apr. 25, 2018

(65) Prior Publication Data

US 2019/0179898 A1  Jun. 13, 2019

Related U.S. Application Data

(60) Provisional application No. 62/598,459, filed on Dec. 13, 2017.

(51) Int. Cl.
*G06F 16/36* (2019.01)
*G06F 16/31* (2019.01)
(Continued)

(52) U.S. Cl.
CPC ............ *G06F 16/36* (2019.01); *G06F 3/0482* (2013.01); *G06F 3/0483* (2013.01);
(Continued)

(58) Field of Classification Search
CPC ...... G06F 17/24; G06F 17/2765; G06F 17/27; G06F 40/30; G06F 40/232; G06F 16/36; G06F 40/247; G06F 40/242
See application file for complete search history.

(56) References Cited

U.S. PATENT DOCUMENTS

| 5,287,278 A | 2/1994 | Rau |
| 5,787,451 A | 7/1998 | Mogilevsky |
| (Continued) | | |

FOREIGN PATENT DOCUMENTS

| WO | 9738376 A2 | 10/1997 |
| WO | 0041095 A2 | 7/2000 |
| WO | 2009041220 A1 | 4/2009 |

OTHER PUBLICATIONS

"Non-Final Office Action Issued in U.S. Appl. No. 15/951,086", dated Sep. 19, 2019, 18 Pages.
(Continued)

*Primary Examiner* — Samuel G Neway
(74) *Attorney, Agent, or Firm* — Newport IP, LLC; David W. Foster

(57) ABSTRACT

Embodiments build a knowledge base that includes a list of acronyms and their expansions. The list of acronyms may be associated with a particular organization, e.g. a product team, such that the acronym may have a different meaning to a different organization. In some embodiments, acronyms and their expansions are extracted from artifacts associated with the organization, e.g. documents, emails, attachments, calendar items, etc. Multiple potential definitions identified within the artifacts may be ranked based on contextual data extracted from the artifacts, e.g. who authored the artifact, when was the artifact modified, how often did the author use the acronym, an author's rank in the organization, how long has an author been part of the organization, an author's relationship to other authors, etc. By basing the analysis on artifacts associated with the organization the resulting definitions may be more accurate than if broader resources, such as dictionary definitions, were used.

20 Claims, 8 Drawing Sheets

(51) Int. Cl.

| | | |
|---|---|---|
| *G06Q 10/10* | (2012.01) | |
| *G06F 40/30* | (2020.01) | |
| *G06F 40/106* | (2020.01) | |
| *G06F 40/134* | (2020.01) | |
| *G06F 40/232* | (2020.01) | |
| *G06F 40/242* | (2020.01) | |
| *G06F 40/247* | (2020.01) | |
| *G06F 40/253* | (2020.01) | |
| *G06F 9/451* | (2018.01) | |
| *G06F 3/0482* | (2013.01) | |
| *G06F 3/0483* | (2013.01) | |
| *G06F 3/0484* | (2013.01) | |
| *G06F 9/445* | (2018.01) | |
| *G06F 9/50* | (2006.01) | |
| *G06F 9/54* | (2006.01) | |
| *G06F 11/30* | (2006.01) | |
| *G06F 40/166* | (2020.01) | |

(52) U.S. Cl.
CPC ...... *G06F 3/04842* (2013.01); *G06F 9/44526* (2013.01); *G06F 9/453* (2018.02); *G06F 9/5038* (2013.01); *G06F 9/541* (2013.01); *G06F 11/302* (2013.01); *G06F 16/31* (2019.01); *G06F 40/106* (2020.01); *G06F 40/134* (2020.01); *G06F 40/232* (2020.01); *G06F 40/242* (2020.01); *G06F 40/247* (2020.01); *G06F 40/253* (2020.01); *G06F 40/30* (2020.01); *G06Q 10/10* (2013.01); *G06F 40/166* (2020.01)

(56) References Cited

U.S. PATENT DOCUMENTS

| | | |
|---|---|---|
| 6,199,081 B1 | 3/2001 | Meyerzon et al. |
| 6,535,906 B1 | 3/2003 | Barber et al. |
| 6,785,869 B1 | 8/2004 | Berstis |
| 7,136,876 B1 | 11/2006 | Adar et al. |
| 7,236,923 B1 | 6/2007 | Gupta |
| 7,793,224 B1 | 9/2010 | Ayers |
| 8,316,007 B2 | 11/2012 | Liao |
| 8,667,487 B1 | 3/2014 | Boodman et al. |
| 8,739,249 B1 | 5/2014 | Kay et al. |
| 9,020,805 B2 | 4/2015 | Boguraev et al. |
| 9,098,500 B1 | 8/2015 | Asokan et al. |
| 9,311,286 B2 | 4/2016 | Bank et al. |
| 9,864,741 B2 | 1/2018 | Mahmud et al. |
| 2002/0059251 A1* | 5/2002 | Stern .................. G06F 16/9535 |
| 2004/0205672 A1 | 10/2004 | Bates et al. |
| 2005/0165778 A1 | 7/2005 | Obata et al. |
| 2005/0240664 A1 | 10/2005 | Chen et al. |
| 2007/0016625 A1 | 1/2007 | Berstis |
| 2007/0124375 A1 | 5/2007 | Vasudevan et al. |
| 2007/0174045 A1 | 7/2007 | Kao et al. |
| 2008/0059539 A1 | 3/2008 | Chin et al. |
| 2008/0086297 A1* | 4/2008 | Li .......................... G06F 17/28 704/3 |
| 2008/0159633 A1 | 7/2008 | van Eikeren et al. |
| 2009/0313245 A1 | 12/2009 | Weyl et al. |
| 2010/0318897 A1 | 12/2010 | Wang |
| 2011/0047457 A1* | 2/2011 | Flint .................. G06F 17/2282 715/261 |
| 2011/0320408 A1 | 12/2011 | Grosse et al. |
| 2011/0320459 A1 | 12/2011 | Chisholm |
| 2012/0109974 A1* | 5/2012 | Feng .................. G06F 17/2247 707/748 |
| 2012/0278694 A1 | 11/2012 | Washio |
| 2012/0290950 A1 | 11/2012 | Rapaport et al. |
| 2013/0110500 A1* | 5/2013 | Feng .................. G06F 17/2282 704/9 |
| 2013/0191739 A1* | 7/2013 | Bank .................. G06F 17/2276 715/259 |
| 2014/0074860 A1 | 3/2014 | Medelyan |
| 2014/0074886 A1 | 3/2014 | Medelyan et al. |
| 2015/0066480 A1* | 3/2015 | Endo .................. G06F 17/2765 704/9 |
| 2015/0088493 A1 | 3/2015 | Thakore |
| 2015/0234809 A1* | 8/2015 | Moore, Jr. ......... G06F 17/2735 704/9 |
| 2015/0309667 A1 | 10/2015 | Wang |
| 2015/0317390 A1 | 11/2015 | Mills et al. |
| 2016/0105386 A1* | 4/2016 | Anders ................ G06F 16/335 709/206 |
| 2016/0283839 A1 | 9/2016 | Ye et al. |
| 2017/0199963 A1 | 7/2017 | Kondadadi et al. |
| 2018/0196921 A1* | 7/2018 | Devarakonda ......... G16H 50/70 |
| 2019/0179653 A1 | 6/2019 | Von Haden et al. |
| 2019/0179680 A1 | 6/2019 | Von Haden et al. |
| 2019/0179898 A1* | 6/2019 | Jetley .................... G06F 3/0482 |
| 2019/0179958 A1 | 6/2019 | Curzi et al. |

OTHER PUBLICATIONS

"Non Final Office Action Issued in U.S. Appl. No. 15/912,076", dated Jul. 26, 2019, 8 Pages.

"International Search Report & Written Opinion for PCT Patent Application No. PCT/US18/062387", dated Feb. 15, 2019, 11 Pages.

"International Search Report & Written Opinion for PCT Patent Application No. PCT/US18/062388", dated Feb. 15, 2019, 12 Pages.

"Non Final Office Action Issued in U.S. Appl. No. 15/923,962", dated Oct. 31, 2019, 16 Pages.

Hoffman, Chris, "How to Install and Use Add-ins for Microsoft Office", Retrieved from: https://www.howtogeek.com/260569/how-to-install-and-use-add-ins-for-microsoft-office/, Jul. 5, 2016, 7 Pages.

"International Search Report and Written Opinion Issued in PCT Application No. PCT/US2018/062386", dated Feb. 12, 2019, 10 Pages.

"International Search Report and Written Opinion Issued in PCT Application No. PCT/US18/061894", dated Feb. 12, 2019, 10 Pages.

"Notice of Allowance Issued in U.S. Appl. No. 15/912,076", dated Feb. 10, 2020, 10 Pages.

Bhawani, et al., "A Linguistically Driven Framework for Query Expansion via Grammatically Constituent Highlighting and Role-Based Concept Weighting", In Journal information Processing and Management vol. 52,Issue 2, Mar. 2016, 19 Pages.

James, et al., "Extraction and Disambiguation of Acronym-Meaning Pairs in Medline", In Journal of Medinfo vol. 10, 2001, 2001, 11 Pages.

"Non Final Office Action Issued in U.S. Appl. No. 15/923,962", dated Jun. 15, 2020, 18 Pages.

"Final Office Action Issued in U.S. Appl. No. 15/951,086", dated Apr. 20, 2020, 24 Pages.

* cited by examiner

GENERATING AN ACRONYM INDEX BY MINING A COLLECTION OF DOCUMENT ARTIFACTS

CROSS-REFERENCE TO RELATED APPLICATIONS

This application claims the benefit of U.S. provisional patent application No. 62/598,459, entitled "CONTENT AUGMENTATION LOOP AND PERPETUAL WORKFLOWS FOR PRODUCTIVITY APPLICATIONS", which was filed on Dec. 13, 2017, and which is expressly incorporated herein by reference in its entirety.

BACKGROUND

Unfamiliar acronyms and new terminologies present barriers when people join an organization or work with a new subject matter. However, determining correct definitions for acronyms used by an organization has proved challenging, in part because the meanings of acronyms and terms evolve. For example, during a product development process, new acronyms and terms are created organically to describe novel concepts and features. However, as product development moves in new directions, so too may the meanings of some acronyms and terms. As such, the true meanings of acronyms and terms tend not to be defined canonically but spread out among "artifacts" (documents, emails, calendar entries, etc.) produced by a variety of people during product development.

In these scenarios, an acronym's expansion, e.g., the words that the acronym represents, may not be easily determined by a human manually analyzing artifacts associated with the organization. Expansions used in some documents may be outdated, or may be provided by someone who is not an authority, and there is no reliable way for a human to know these details without an exhaustive review of the artifacts. Thus, it is a technological problem to determine acronym expansions and term definitions for a particular organization.

It is with respect to these and other technical challenges that the disclosure made herein is presented.

SUMMARY

Embodiments build a knowledge base that includes a list of acronyms and their expansions. The list of acronyms may be associated with a particular organization, e.g. a product team, a school, a club, etc., such that the acronym may have a different meaning to a different organization. In some embodiments, acronyms and their expansions are extracted from artifacts associated with the organization, e.g. documents, emails, attachments, calendar items, etc. Multiple potential definitions identified within the artifacts may be ranked based on contextual data extracted from the artifacts, e.g. who authored the artifact, when was the artifact modified, how often did the author use the acronym, an author's rank in the organization, how long has an author been part of the organization, an author's relationship to other authors, etc. By analyzing artifacts over time, evolving definitions may be identified, and a most recent expansion endorsed by a person determined to be an authority may be selected for the knowledge base. By basing the analysis on artifacts associated with the organization the resulting definitions may be more accurate than if broader resources, such as dictionary definitions, were used.

In one example, a system can build a knowledge base that includes a list of acronyms and their expansions for a particular user, team, organization, etc. Contextual data associated with that particular user, team, or organization can be analyzed to find the most relevant meaning for a list of acronyms. An example of contextual data can include organizational data, such as a company organization chart listing a ranked hierarchy and roles of each employee. Such contextual data can be analyzed with a set of documents to rank expansions and definitions based on who in the organization used one or more acronyms, and when they used them. The use of organizational data or other relevant contextual data produces a knowledge base that is more local to a person, team, a department, or an organization, which may be more accurate than a database using broader resources, such as dictionary definitions, etc.

The techniques disclosed herein can improve user interaction with a computing device, which can help a user's productivity and help reduce the number of inadvertent inputs. Also, by providing more accurate and more contextually relevant acronym expansions, a system can operate more efficiently with respect to the use of memory, processing resources, network resources, etc. Having more accurate and more contextually relevant data can reduce the number of emails and other forms of communication that may be used to clarify and correct inaccurate definitions or acronym expansions. Other technical effects other than those mentioned herein can also be realized from implementations of the technologies disclosed herein.

In this way, the technological problem of determining acronym expansions and term definitions relevant to an organization is solved.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
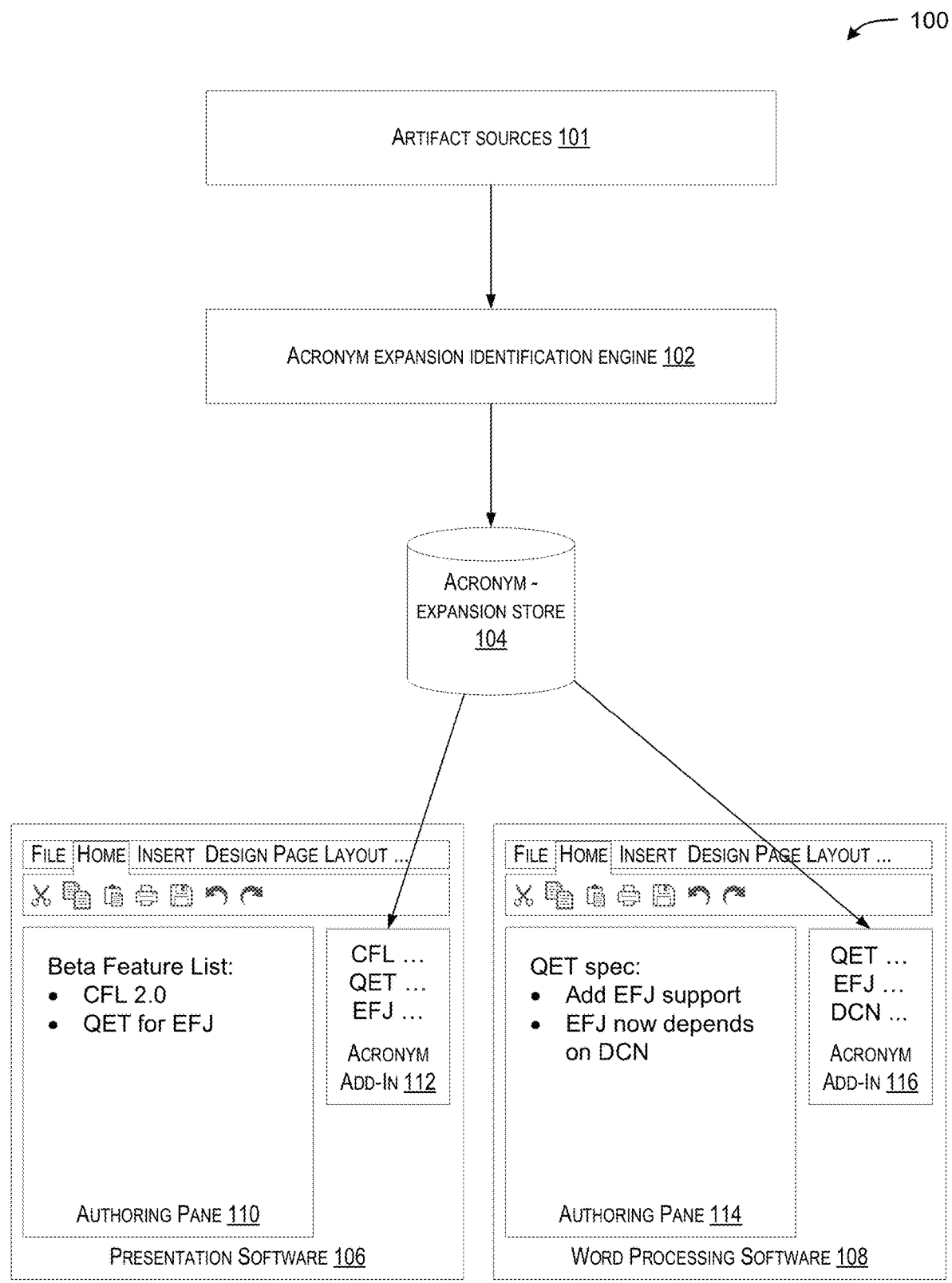
FIG. 1 illustrates a block diagram for identifying acronym expansions and providing them to an application.

FIG. 1 illustrates a block diagram 100 for identifying acronym expansions and providing them to an application. In some embodiments, artifact sources 101 contains documents, emails, spreadsheets, slide decks, calendar events, webpages, and the like. These artifacts may be provided to or retrieved from acronym expansion identification engine 102. Acronym expansion identification engine 102 may process the artifacts, including metadata associated with the artifacts, to associate acronyms with acronym expansions. In some embodiments, acronym to expansion mappings are stored in acronym expansion store 104. The list of acronyms and expansions retain and honor permissions of each of the artifacts—e.g. if an acronym was extracted from a document created by an executive, acronym expansion store 104 will only allow equivalently credentialed users access the acronym and expansion.

In some embodiments, acronym expansions from acronym expansion store 104 are retrieved by software applications, such as presentation software 106 or word processing software 108. These applications include authoring panes 110 and 114 in which main document content is displayed. Applications 106 and 108 also include acronym add-ins 112 and 116. In some embodiments, an acronym add-in may analyze content displayed in an authoring pane to identify potential acronyms. The acronym add-in may perform a query against acronym expansion store 104 to determine an acronym's expansion. For illustrative purposes, the acronym expansion store 104 is also referred to herein as a "knowledge base 104."

Figure 2:
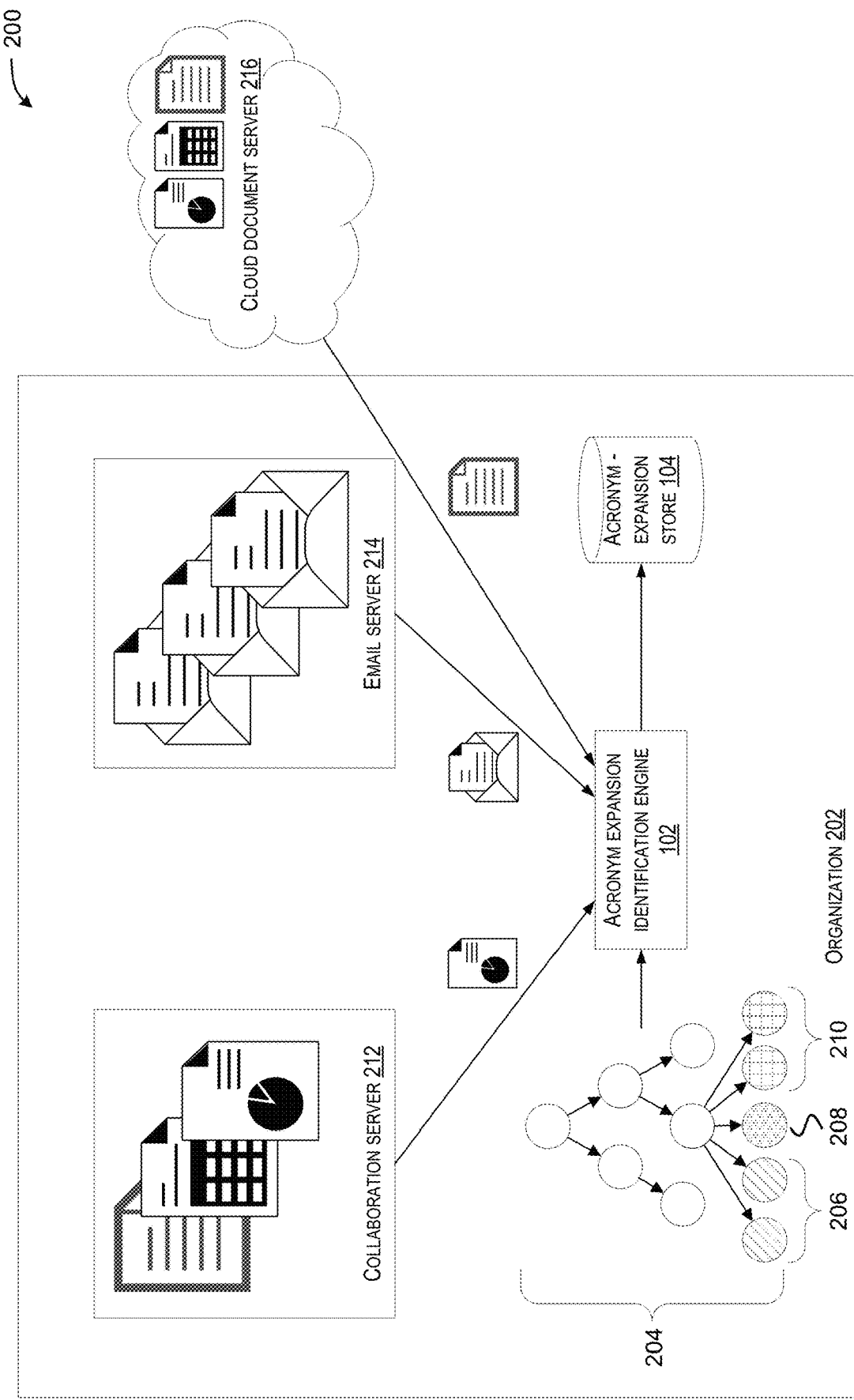
FIG. 2 illustrates a block diagram for extracting acronym expansions from artifacts in conjunction with organization data.

FIG. 2 illustrates a block diagram 200 for extracting acronym expansions from artifacts in conjunction with organization data. In some embodiments, acronym expansion identification engine 102 receives organizational data from organizational chart 204 associated with organization 202. Organizational chart 204, as depicted, represents a personnel hierarchy within an organization. Each level in the chart may represent a level within the organization, e.g. the top level represents the CEO, president, or other leader, the middle two layers represent middle management, while the lower layer represents a team of individual contributors. In some embodiments, different branches of the organizational chart 204 represent different sub organizations, e.g. product teams, divisions, etc.

In some embodiments, individuals may have different job roles, specialties, training, or other distinguishing characteristics. Individuals 206, 208, and 210 represent three groups of individuals having different roles within the organization. For example, individuals 206 may be product engineers while individual 208 is a marketer and individuals 210 are test engineers.

In some embodiments, this information contained in the organizational chart 204 may be used to disambiguate acronym expansions. For example, when an acronym expansion is determined to be related to an engineering process, an expansion defined by a product engineer may be given more weight than an expansion defined by a marketer, even if the marketer has a higher rank in the organizational chart.

In some embodiments, acronym expansion identification engine receives artifacts to be processed from collaboration server 212, email server 214, cloud document server 216, or the like. In some embodiments, the artifacts stored on these servers are associated with organization 202. This enables expansions to be identified that are particular to organization 202, in contrast to determining expansions based on a global dictionary, web search, etc.

For example, collaboration server 212 may store slide presentations, spreadsheets, word processing documents, emails, calendar appointments, or the like. One example of a collaboration server is Microsoft® SharePoint®. In some embodiments, acronym expansion identification engine may have access to retrieve the documents stored in collaboration server 212. Additionally or alternatively, collaboration server 212 may provide stored documents to acronym expansion identification engine 102. Acronym expansion identification engine 102 may also be implemented as an add-in executing within collaboration server 212.

Acronym expansion identification engine 102 may similarly receive artifacts from email server 214. These artifacts may include emails, attachments, or any other type of document. Emails received from email server 214 may include to, from, and other addressing information usable to prioritize acronym expansions. For example, potential acronym expansions contained in an email having a broad distribution (i.e. having more or many more recipients than a typical email) may be ranked higher based on the intuition that an email having a broad distribution is more likely to be well thought out and accurate than an email addressed to a small number of individuals.

In some embodiments, while cloud document server 216 exists physically outside of organization 202, the documents contained thereon may still be considered part of the organization. One example of a cloud document server 216 is DropBox®.

Figure 3:
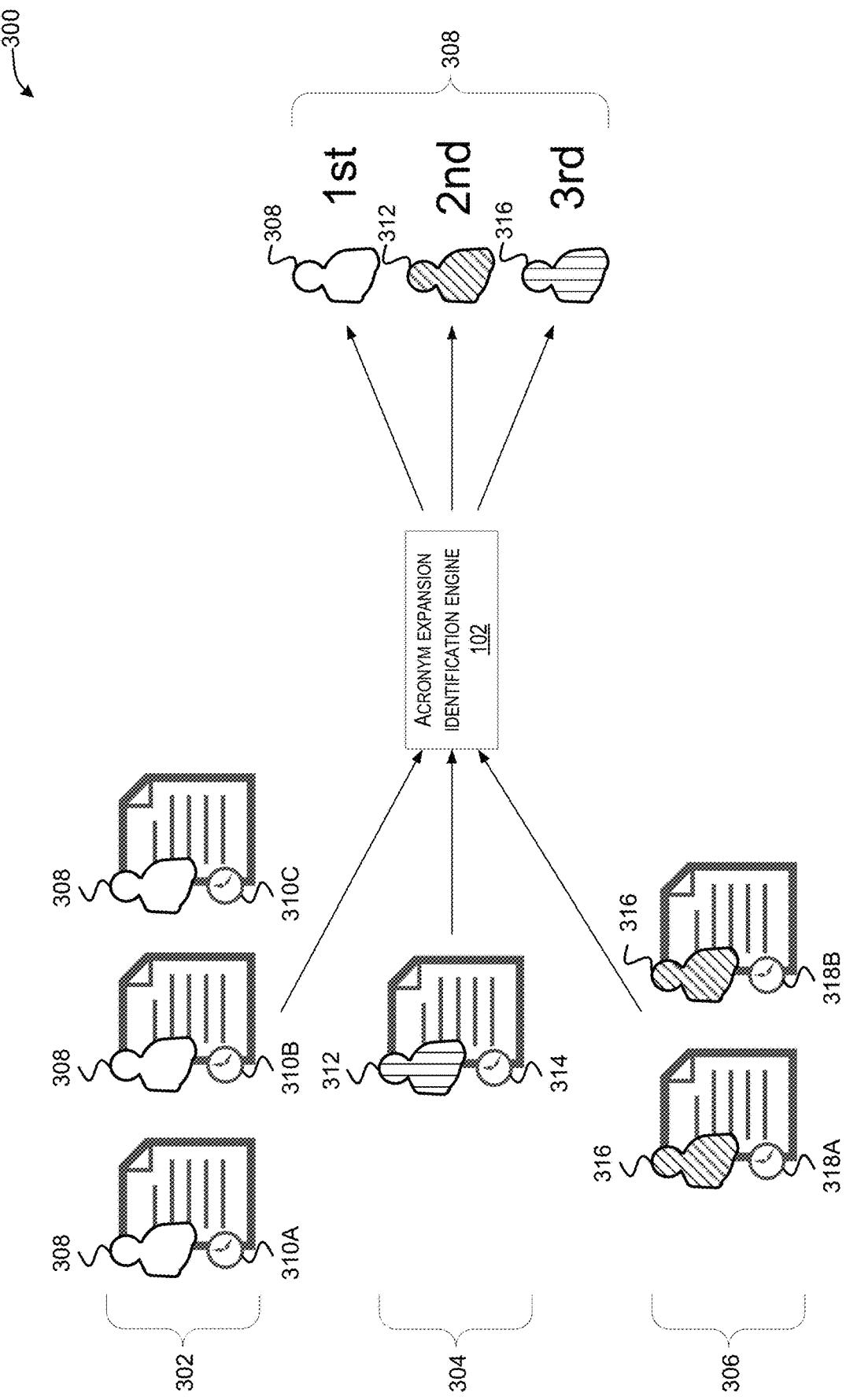
FIG. 3 illustrates a block diagram for ranking users based on contextual data associated with artifacts.

FIG. 3 illustrates a block diagram 300 for ranking users based on contextual data associated with artifacts. In some embodiments, acronym expansion identification engine 102 has received documents 302, document 304, and documents 306. These artifacts have been grouped by their author, authors 308, 312, and 316, respectively. FIG. 3 also illustrates timestamps 3108, 310B, 310C, 314, 318A, and 318B indicating a last known modification date of the corresponding artifact.

In some embodiments, documents 302, document 304, and documents 306 include one or more acronyms and related expansions. Acronyms and related expansions may be identified in many ways. For example, an acronym may be determined to exist when two or more letters appear adjacent to each other, and are in all-caps. Expansions may be identified as a number of words equal to the number of letters that follow the acronym, often in a parenthetical, where each word begins with the corresponding letter. However, any acronym-expansion identification algorithm is similarly contemplated. Furthermore, while acronyms and expansions are discussed throughout this disclosure, definitions and terms, or any other construct in which a first portion of an artifact represents a second portion of the artifact, is similarly contemplated.

In some embodiments, authors are ranked or otherwise prioritized to determine which expansion should be associated with the acronym for organization 202. For example, an author may be ranked based on a number of artifacts in which that author has used an acronym, defined an acronym, or the like. The author may also be ranked based on a number of times the acronym appears in an artifact created by or edited by the author. Combinations of rankings are similarly contemplated. When artifacts have multiple authors or editors, and modifications by different authors can be distinguished, these same techniques may be applied to portions of the documents associated with specific authors, while ignoring portions of artifacts created by or modified by other authors.

In the case of FIG. 3, author 308 has used the acronym in question in three different artifacts, while author 312 has used the acronym in one artifact, while author 316 has used the acronym in two artifacts. As such, acronym expansion identification engine 102 has ranked author 308 first, author 312 second, and author 316 third. Based on this result, the acronym will have an expansion identified based on documents created by or edited by user 308.

Figure 4:
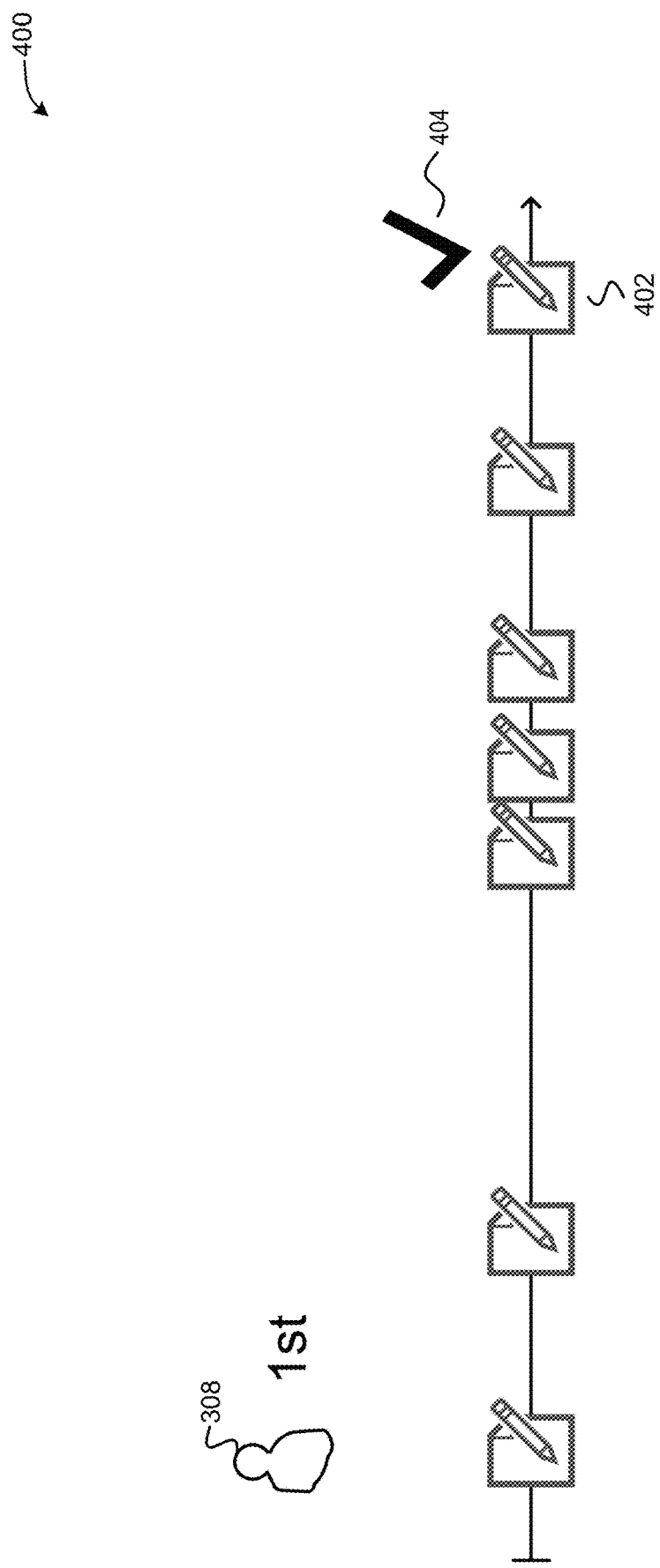
FIG. 4 illustrates a timeline of artifact edits used to select an acronym expansion.

FIG. 4 illustrates a timeline 400 of artifact edits used to select an acronym expansion. Specifically, timeline 400 depicts a series of edits performed by user 308, who according to FIG. 3 has created/edited documents containing the acronym more than anyone else. In some embodiments, an acronym expansion found in the most recently modified artifact 402 is identified as the proper expansion for the acronym for this organization. This determination is indicated by checkmark 404.

Figure 5:
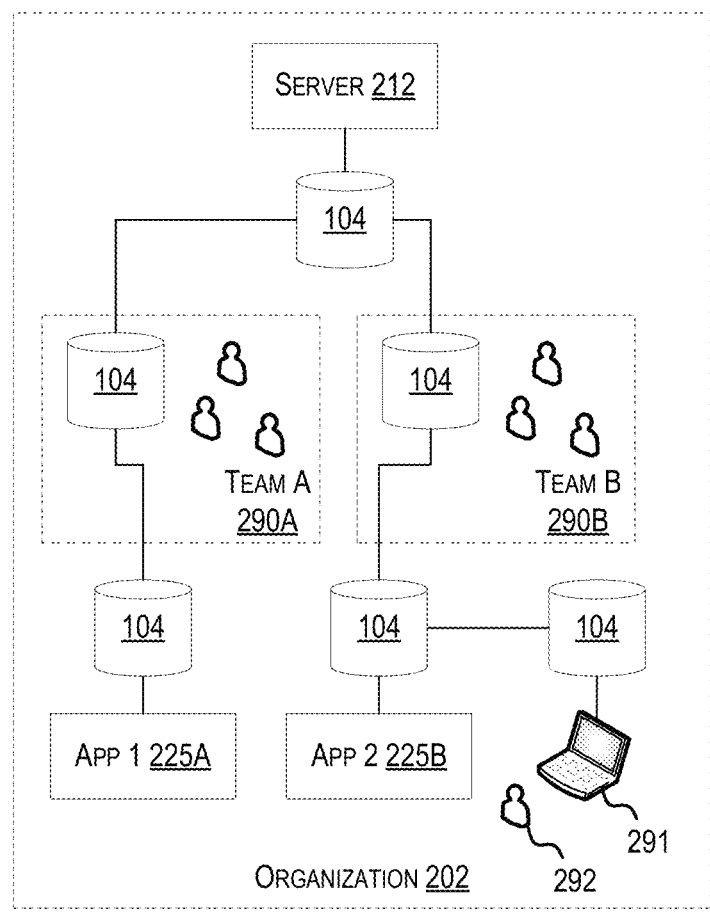
FIG. 5 illustrates examples of a knowledge base persisting across a number of devices, applications, users, teams, and organizations.

In some configurations, a knowledge base can persist across a number of devices, applications, users, teams, and organizations. In one illustrative example, as shown in FIG. 5, a knowledge base 104 can be maintained by a server 212 associated with an organization 202. The knowledge base 104 can be synchronized with instances of the knowledge base 104 that are stored in association with one or more teams 290 (e.g., company departments), applications 225, individual computers 191, and individual users 292.

In some configurations, the knowledge base 104 can be updated or accessed by each application, team, device, individual or organization in a controlled manner by the use of access control rights. In one example, each team, device, application, or certain individuals can have access to certain portions of the knowledge base 104. Each portion can comprise acronym expansions that are associated with a role of an individual, team, or company. Thus, each team, device, application, or certain individuals can have access to contextually-relevant acronym expansions.

Figure 6:
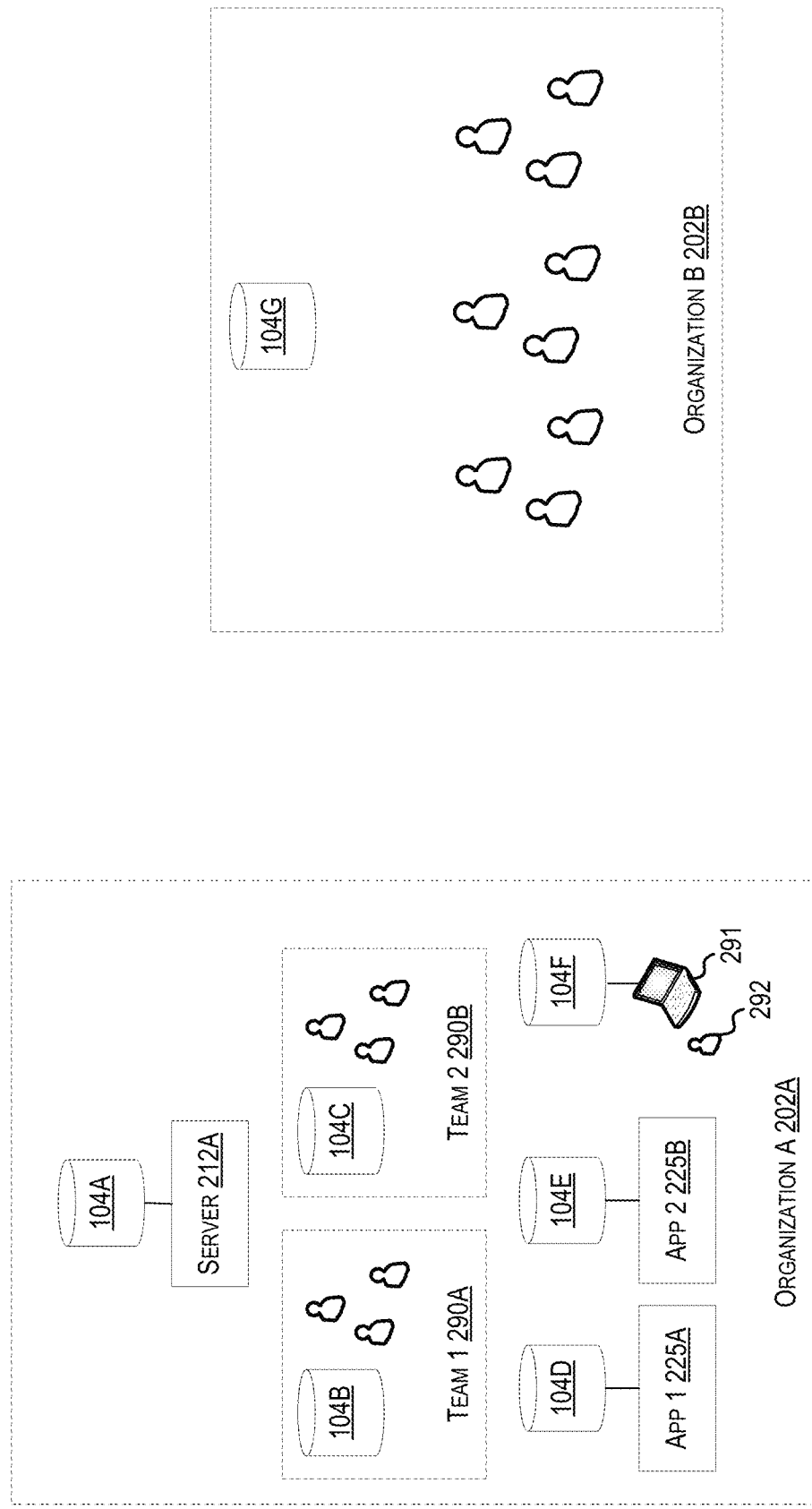
FIG. 6 illustrates an individual knowledge base maintained in association with individual applications, individual computers, individual users, teams, or individual organizations.

In another illustrative example, as shown in FIG. 6, an individual knowledge base can be maintained in association with individual applications, individual computers, individual users, teams, or individual organizations. In the example shown in FIG. 6, a first knowledge base 104A can be maintained by a first server 212A associated with a first organization 202A. Thus, individuals associated with the organization 202A can have access to acronym expansions that are relevant to the first organization 202A.

A second knowledge base 104B and third knowledge base 104C can be maintained by the first team 290A and a second team 290B. Thus, separate teams (e.g. divisions within an organization), such as a sales team and an engineering team, can have access to acronym expansions that are relevant to each team.

A fourth knowledge base 104D and a fifth knowledge base 104E can be maintained by individual applications (225A and 225B). Thus, individual applications, such as sales applications or engineering applications, can have access to acronym expansions that are relevant to the function of each application.

Additional independent knowledge base resources, such as the sixth knowledge base 104F, can be maintained by one or more computers 291 and individuals 192. Thus, individual users having certain roles or individual computers having certain functions can have access to acronym expansions that are contextually relevant to the respective roles or functions.

Similarly, other organizations, such as a second organization 202B can maintain a knowledge base 104G that is separate from the knowledge base 104A of the first organization 202A. Thus, individuals associated with the second organization 202B can have access to acronym expansions that are contextually relevant to the second organization, while having autonomy from the first organization 202A.

Figure 7:
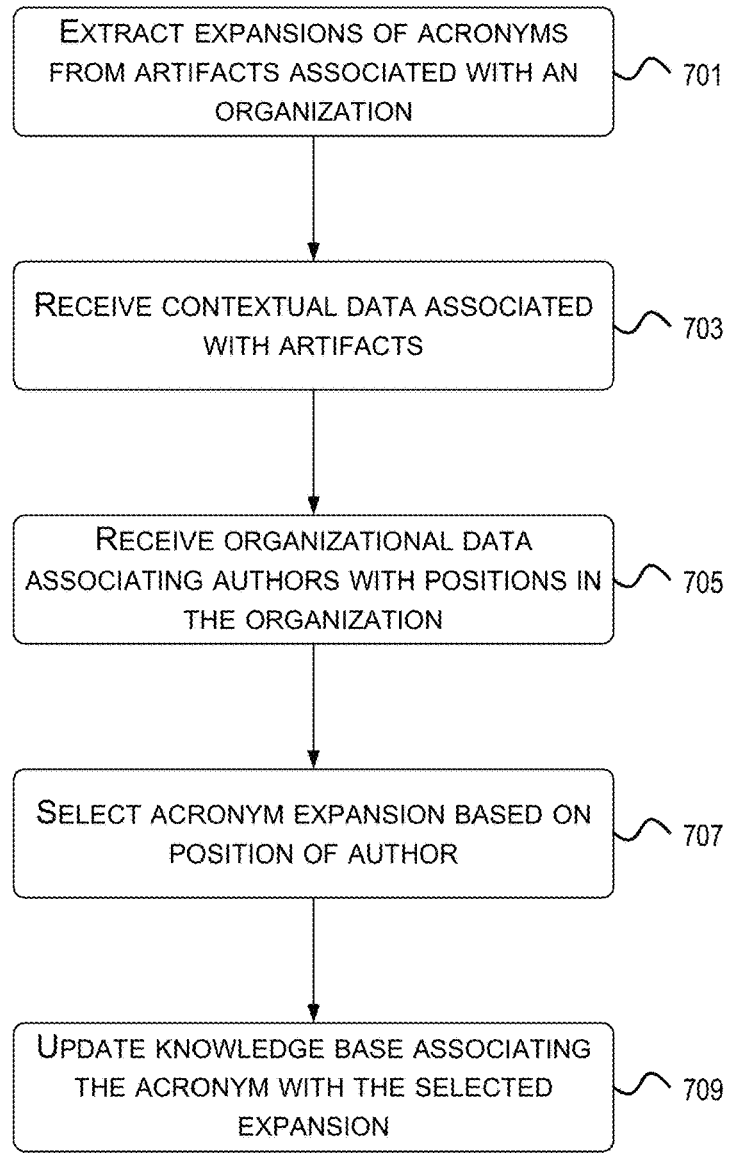
FIG. 7 illustrates aspects of a routine for enabling aspects of the techniques disclosed herein as shown and described below.

FIG. 7 illustrates aspects of a routine 700 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, the routine 700 begins at operation 701 where acronyms and corresponding expansions are extracted from artifacts associated with an organization. In some embodiments, artifacts include word processing documents, emails, spreadsheets, presentations slide decks, calendar appointments, websites, and the like. Artifacts may be accessed locally or retrieved from a server, such as collaboration server 212, email server 214, cloud server 216, or the like. Artifacts may be processed using any manner of acronym and expansion identification algorithms.

In some embodiments, acronym expansion identification is a continuous process applied across an organization, drawing artifacts from one or more servers within the organization, with the goal of building a glossary of acronyms and expansions based on how the acronyms are currently being used. However, different artifact authors may use different expansions for a given acronym. Also, a given artifact author may use different expansions for the same acronym over time. Thus, in order to provide the most accurate acronym expansions, various weights and criteria associated with the different artifacts, authors, and the like, are considered.

Next, at operation 703, contextual data associated with artifacts is received. In some embodiments, contextual data includes file attributes associated with an artifact, such as the creation date, last modified date, file size, and the like. Additionally or alternatively, contextual data may be stored by a server computing device where the artifact is stored. For example, collaboration server 212 or email server 214 may contain contextual data associated with an artifact. Collaboration server 212 may store when an artifact was uploaded and by whom, when the artifact was modified and by whom, and even what the modifications were. Contextual data may also be referred to as metadata, i.e. data about another piece of data, in this case an artifact.

Next, at operation 705, organization data associating authors with positions in the organization is received. In some embodiments, organization data includes an organization chart, such as organization chart 204. Organization data may indicate who in the organization works for whom, what level or rank an individual has (e.g. president, vice president, manager, individual contributor), job type (product development, marketing, human resources, management, etc.), job field (accounting, food service, legal services, manufacturing, computer programming, etc.), or the like.

Next, at operation 707, for a given acronym found in one or more of the artifacts, when there are multiple expansions used throughout the artifacts to define the given acronym by multiple different authors, an acronym expansion is selected based on a position of the author within the organization chart. For example, an expansion created by the author having the highest rank may be selected.

Additionally or alternatively, an expansion may be selected based on an author's job field. For example, the acronym DDR may be expanded by a computer engineer as "Double Data Rate", in reference to computer memory. However, a game designer may expand the same acronym to "Dance Dance Revolution", a video game. In some embodiments, selecting an expansion based on job field is based on performing a text comparison between an author's job field, e.g. as listed in an organization chart, and that author's expansion. More weight will be given to an expansion when there is fidelity between the author's job field and the author's expansion. For example, if an author is a game designer, and the author is suggesting an expansion of "Dance Dance Revolution," a search analysis may find a correlation between "game designer" and "Dance Dance Revolution," in which case more weight will be given to the game designer's expansion than if a computer engineer made the same claim.

In some embodiments, an acronym expansion is selected based on a perception of experience of the author. For example, an expansion defined by someone who's been with the organization for many years may be given more weight than an expansion defined by someone who just joined the team. Similarly, an author may also be considered experienced if she has used an acronym more than her colleagues.

In some embodiments, an amount of perceived experience is measured as an absolute value, in contrast with measuring relative experience between authors. For example, a tally may be kept each time an author has used an acronym in the artifacts. Additionally or alternatively, a tally may be kept each time an author has used and/or defined an expansion in the artifacts. When an author has crossed a threshold number of times using an acronym/expansion, the author is given greater weight when selecting an expansion. This is based on the intuition that someone who has used an acronym a defined number of times is likely to know more about the proper expansion than someone who hasn't.

In some embodiments, an acronym expansion is selected by first selecting an author using the above-described techniques, and then selecting an acronym expansion from an artifact most recently modified by the author. In this way, not only is the most relevant author chosen to define the acronym, but that author's most recent definition is chosen. Other techniques, such as selecting an acronym expansion used most frequently by the selected author, are also considered. In some embodiments, an acronym expansion may be selected based on the selected author editing a document containing an expansion, but failing to alter the expansion, based on the intuition that the selected author has signed off on an expansion that was viewed but not altered.

Next, at operation 709, an organization's knowledge base associating acronyms to expansions is updated to include the selected expansion. Additionally or alternatively, the identified acronym-expansion pair may be displayed to an end user, e.g. in an acronyms add-in, in a query result, or the like.

Figure 8:
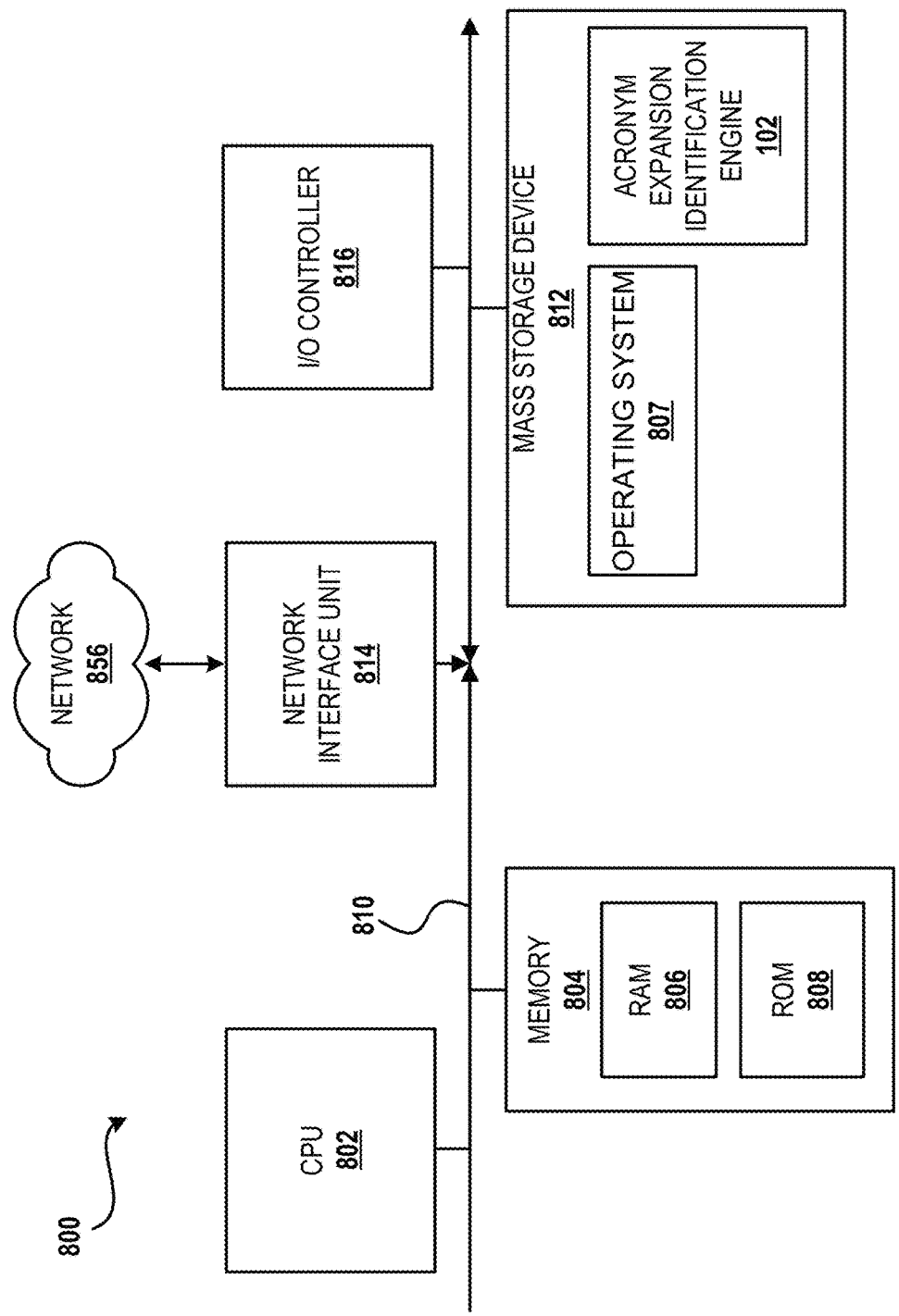
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as a computing device executing acronym expansion identification engine 102 (FIG. 8), capable of executing the program components described herein. Thus, the computer architecture 800 illustrated in FIG. 8 illustrates an architecture for a server computer, a mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, other data, and one or more acronym expansion identification engine 102.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 856 and/or another network (not shown). The computer architecture 800 may connect to the network 856 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

The disclosure presented herein also encompasses the subject matter set forth in the following clauses:

Clause 1. A computer-implemented method for improving understanding of acronyms, comprising: extracting a plurality of expansions of an acronym from a plurality of artifacts associated with an organization; receiving contextual data associated with the plurality of artifacts including authors of individual artifacts; receiving organization data associating authors with positions within the organization; selecting an acronym expansion based in part on a position of an author associated with the expansion; and updating a knowledge base associating the acronym with the selected expansion, wherein the knowledge base is accessible by one or more applications for the purpose of displaying the expansion in the one or more applications.

Clause 2. The method of Clause 1, wherein the contextual data includes last modified dates associated with the plurality of individual artifacts, and wherein selecting the acronym expansion is based in part on an artifact most recently modified by the author associated with the expansion.

Clause 3. The method of Clause 1, further comprising: counting a number of times authors used the acronym; and wherein selecting the acronym expansion includes selecting an author based in part on the number of times the author used the acronym.

Clause 4. The method of Clause 3, wherein the author is selected based in part on the number of times the author used the acronym exceeding a threshold.

Clause 5. The method of Clause 3, wherein the author is selected based in part on a frequency with which the author used the acronym.

Clause 6. The method of Clause 3, wherein the author is selected based in part on the number of times the author used the acronym relative to the numbers of times other authors used the acronym.

Clause 7. The method of Clause 1, wherein selecting the acronym expansion is based in part on the position of the author having relevance to a meaning of the expansion.

Clause 8. The method of Clause 7, wherein the expansion having relevance to a meaning of the expansion is determined based on a word association between the words comprising the expansion and the words comprising the position.

Clause 9. The method of Clause 1, wherein the knowledge base is stored in association with at least one of an organization, a division within the organization, a computing device, an individual user, or an application of the one or more applications, wherein access permissions control the updates to the knowledge based on an association between the author and the organization, the division, the computing device, the individual user, or the application.

Clause 10. A computing device for improving understanding of acronyms, comprising: one or more processors; a memory in communication with the one or more processors, the memory having computer-readable instructions stored thereupon which, when executed by the one or more processors, cause the computing device to: extract a plurality of expansions of an acronym from a plurality of artifacts associated; receive contextual data associated with the plurality of artifacts including authors and dates of modification of individual artifacts; select one of the plurality of authors based in part on a frequency of use of the acronym compared to other authors; identify an acronym expansion based on an expansion found in an artifact most recently modified by the selected author; and update a knowledge base associating acronyms with the selected expansion, wherein the knowledge base is accessible by one or more applications for the purpose of displaying the expansion in the one or more applications.

Clause 11. The computing device of Clause 10, wherein identifying the acronym expansion is based in part on a position of the author within an organization having relevance to a meaning of the expansion.

Clause 12. The computing device of Clause 11, wherein the expansion having relevance to a meaning of the expansion is determined based on a word association between the words comprising the expansion and the words comprising the position.

Clause 13. The computing device of Clause 11, wherein the position includes a hierarchical rank, a job type, or a job field.

Clause 14. The computing device of Clause 11, wherein selecting one of the plurality of authors is based in part based in part on when the artifact was created.

Clause 15. A computer-implemented method, comprising: extracting a plurality of expansions of an acronym from a plurality of artifacts associated with an organization; receiving one or more file attributes associated with the plurality of artifacts including authors of individual artifacts; ranking authors within the organization based on a determined expertise associated with the acronym; selecting one of the plurality of expansions based on the ranking of authors; and updating a knowledge base associating acronyms with the selected expansion, wherein the knowledge base is accessible by one or more applications for the purpose of displaying the expansion in the one or more applications.

Clause 16. The method of Clause 15, wherein an artifact includes a word processing document, an email, a spreadsheet, a presentation slide deck, calendar appointment, or a web page.

Clause 17. The method of Clause 15, wherein the file attributes are received from a server computer storing one or more of the artifacts.

Clause 18. The method of Clause 15, wherein expertise is determined based on how long the author has been a part of the organization.

Clause 19. The method of Clause 15, wherein expertise is determined based on the author's rank within the organization.

Clause 20. The method of Clause 15, wherein the one or more file attributes includes dates of modification, and wherein the one of the plurality of expansions comprises an expansion found in an artifact most recently modified by the author.

What is claimed is:

1. A computer-implemented method for improving understanding of acronyms, comprising:
    extracting a plurality of expansions of an acronym from a plurality of artifacts associated with an organization;
    receiving contextual data associated with the plurality of artifacts including authors of individual artifacts;
    receiving organization data associating authors with positions within the organization;
    selecting an acronym expansion based in part on a position within the organization of an author associated with the selected acronym expansion; and
    updating a knowledge base by associating the acronym with the selected acronym expansion, wherein one or more applications iteratively access the knowledge base in response to keyboard input to retrieve acronym expansions associated with the keyboard input, and wherein the one or more retrieved acronym expansions are displayed in the one or more applications.

2. The method of claim 1, wherein the contextual data includes last modified dates associated with the plurality of individual artifacts, and wherein selecting the acronym expansion is based in part on an artifact most recently modified by the author associated with the selected acronym expansion.

3. The method of claim 1, further comprising:
    counting a number of times authors used the acronym; and
    wherein selecting the acronym expansion includes selecting an author based in part on the number of times the selected author used the acronym.

4. The method of claim 3, wherein the selected author is selected based in part on the number of times the selected author used the acronym exceeding a threshold.

5. The method of claim 3, wherein the selected author is selected based in part on a frequency with which the selected author used the acronym.

6. The method of claim 3, wherein the selected author is selected based in part on the number of times the selected author used the acronym relative to the numbers of times other authors used the acronym.

7. The method of claim 1, wherein selecting the acronym expansion is based in part on the position of the author associated with the selected expansion having relevance to a meaning of the selected acronym expansion.

8. The method of claim 7, wherein the position of the author associated with the selected expansion has relevance to a meaning of the selected acronym expansion based on a word association between the words comprising the expansion and the words comprising the position.

9. The method of claim 1, wherein the knowledge base is stored in association with at least one of an organization, a division within the organization, a computing device, an individual user, or an application of the one or more applications, wherein access permissions control the updates to the knowledge based on an association between the author associated with the selected expansion and the organization, the division, the computing device, the individual user, or the application.

10. A computing device for improving understanding of acronyms, comprising:
   one or more processors;
   a memory in communication with the one or more processors, the memory having computer-readable instructions stored thereupon which, when executed by the one or more processors, cause the computing device to:
      extract a plurality of expansions of an acronym from a plurality of artifacts authored by a plurality of authors associated with an organization;
      receive contextual data associated with the plurality of artifacts including authors and dates of modification of individual artifacts;
      select one of the plurality of authors based in part on a frequency of use of the acronym compared to other authors of the plurality of authors that have used the acronym;
      identify an acronym expansion based on an expansion found in an artifact most recently modified by the selected author; and
      update a knowledge base by associating the acronym with the identified acronym expansion, wherein one or more applications iteratively access the knowledge base in response to keyboard input to retrieve acronym expansions associated with the keyboard input, and wherein the one or more retrieved acronym expansions are displayed in the one or more applications.

11. The computing device of claim 10, wherein identifying the acronym expansion is based in part on a position of the selected author within the organization having relevance to a meaning of the identified acronym expansion.

12. The computing device of claim 11, wherein the position of the selected author within the organization having relevance to a meaning of the expansion is determined based on a word association between the words comprising the identified acronym expansion and the words comprising the position.

13. The computing device of claim 11, wherein the position of the selected author within the organization includes a hierarchical rank, a job type, or a job field.

14. The computing device of claim 11, wherein selecting one of the plurality of authors is based in part on when the plurality of artifacts was created.

15. A computer-implemented method, comprising:
   extracting a plurality of expansions of an acronym from a plurality of artifacts authored by a plurality of authors associated with an organization;
   receiving one or more attributes associated with the plurality of artifacts including identifiers of authors of individual artifacts;
   ranking authors associated with the organization that have used the acronym, the ranking based in part on a determined expertise with the acronym of each of the plurality of authors;
   selecting one of the plurality of expansions based on the ranking of authors associated with the organization that have used the acronym; and
   updating a knowledge base by associating the acronym with the selected acronym expansion, wherein one or more applications iteratively access the knowledge base in response to keyboard input to retrieve acronym expansions associated with the keyboard input, and wherein the one or more retrieved acronym expansions are displayed in the one or more applications.

16. The method of claim 15, wherein an artifact includes a word processing document, an email, a spreadsheet, a presentation slide deck, calendar appointment, or a web page.

17. The method of claim 15, wherein the file attributes are received from a server computer storing one or more of the artifacts.

18. The method of claim 15, wherein expertise is determined based on how long an author has been a part of the organization.

19. The method of claim 15, wherein expertise is determined based on an author's rank within the organization.

20. The method of claim 15, wherein the one or more file attributes includes dates of modification, and wherein the one of the plurality of expansions comprises an expansion found in an artifact most recently modified by an author.

* * * * *